United States Patent [19]
Du

[11] Patent Number: 6,062,427
[45] Date of Patent: May 16, 2000

[54] BEER KEG AND PRE-MIXED BEVERAGE TANK CHANGE-OVER DEVICE

[75] Inventor: Benjamin R. Du, Laguna Beach, Calif.

[73] Assignee: Du Investments L.L.C., Las Vegas, Nev.

[21] Appl. No.: 09/140,787

[22] Filed: Aug. 27, 1998

[51] Int. Cl.$^7$ .................................................. B67D 1/04
[52] U.S. Cl. ..................... 222/67; 137/113; 137/170.2
[58] Field of Search ..................... 251/75; 137/113, 137/170.2; 91/346, 347; 222/64–68, 394, 399

[56] References Cited

U.S. PATENT DOCUMENTS

| | | |
|---|---|---|
| 740,892 | 10/1903 | Meyer . |
| 1,881,344 | 10/1932 | Apple . |
| 1,967,746 | 7/1934 | Dulaney ..................................... 193/52 |
| 2,332,664 | 10/1943 | Orshansky, Jr. et al. ................ 121/164 |
| 2,452,933 | 11/1948 | Joppich et al. ............................ 225/26 |
| 2,485,408 | 10/1949 | Pezzillo, Jr. ............................... 103/87 |
| 2,509,570 | 5/1950 | Lee ....................................... 222/386.5 |
| 2,535,695 | 12/1950 | Pezillo, Jr. ................................. 103/87 |
| 2,543,686 | 2/1951 | Brown ..................................... 121/164 |
| 2,566,436 | 9/1951 | Waite ........................................ 225/21 |
| 2,671,462 | 3/1954 | Grier ........................................ 137/88 |
| 2,675,946 | 4/1954 | Strempel ................................. 222/137 |
| 2,703,190 | 3/1955 | Muller ...................................... 222/36 |
| 2,722,919 | 11/1955 | Kuhn ....................................... 121/157 |
| 2,761,078 | 8/1956 | McAdam ................................. 310/67 |
| 2,798,440 | 7/1957 | Hall ........................................ 103/152 |
| 2,842,160 | 7/1958 | Rekettye ................................. 137/565 |
| 2,873,684 | 2/1959 | Kaeding ................................... 103/87 |
| 2,880,910 | 4/1959 | Hanson et al. ............................ 222/65 |
| 2,920,575 | 1/1960 | White et al. .............................. 103/87 |
| 2,937,792 | 5/1960 | Firstenberg .......................... 222/144.5 |
| 2,954,146 | 9/1960 | Hullman ................................. 222/193 |
| 2,955,173 | 10/1960 | Kranz ........................................ 200/84 |
| 2,981,182 | 4/1961 | Dietricch ................................ 101/366 |
| 3,166,991 | 1/1965 | Blenkle ..................................... 92/109 |
| 3,166,993 | 1/1965 | Blenkle ..................................... 92/181 |
| 3,167,083 | 1/1965 | Nickell ................................... 137/104 |
| 3,168,967 | 2/1965 | Giampa ................................. 222/129.1 |
| 3,207,070 | 9/1965 | Klinger et al. .......................... 101/366 |
| 3,223,291 | 12/1965 | Thomas .................................. 222/249 |

(List continued on next page.)

FOREIGN PATENT DOCUMENTS

| | | | |
|---|---|---|---|
| 785597 | 10/1934 | France ......................................... 12/3 |
| 1138637 | 10/1962 | Germany . | |
| 144945 | 4/1931 | Switzerland . | |

OTHER PUBLICATIONS

Aro, "Air Operated Diaphragm Pumps"; One page.
Liqui–Box Corporation; "Liqui–Box Press"; Four pages.

*Primary Examiner*—Andres Kashnikow
*Assistant Examiner*—Dinh Nguyen
*Attorney, Agent, or Firm*—Stetina Brunda Garred & Brucker

[57] ABSTRACT

In accordance with the present invention, there is provided a self-actuating fluid dispenser change-over device for selectively dispensing a fluid from multiple fluid sources. The change-over device is provided with a housing having first and second cylinders. The change-over device is further provided with first and second pistons which are interconnected and movable between open and closed positions within respective ones of the first and second cylinders. The change-over device is further provided with a slide valve which is movable between first and second positions for alternately dispensing fluid from a respective one of the first and second cylinders. The change over device is further provided with a linkage which connects the pistons to the slide valve for moving the slide valve in response to movement of the pistons. The linkage has a biasing spring for urging the slide valve between a respective one of the first and second positions. The change-over device configured such that when first piston is in the open position, the second piston is in the closed position and when the second piston is in the open, position the first piston is in the closed position. The pistons move in response to a fluidic pressure differential between the first and second cylinders which is sufficiently large so as to cause flexure of the biasing spring thereby facilitating movement of the slide valve between the first and second positions.

31 Claims, 6 Drawing Sheets

U.S. PATENT DOCUMENTS

| | | | |
|---|---|---|---|
| 3,268,271 | 8/1966 | Yackle | 303/82 |
| 3,351,238 | 11/1967 | Gilbertson | 222/23 |
| 3,537,616 | 11/1970 | Diebel et al. | 222/66 |
| 3,591,051 | 7/1971 | Mitchell et al. | 222/56 |
| 3,606,907 | 9/1971 | Stenberg | 137/113 |
| 3,640,433 | 2/1972 | Rodth | 222/129.2 |
| 3,699,846 | 10/1972 | Stomper | 91/346 |
| 3,719,436 | 3/1973 | McFarlin | 417/356 |
| 3,738,775 | 6/1973 | Stickland | 417/38 |
| 3,741,689 | 6/1973 | Rupp | 417/393 |
| 3,749,527 | 7/1973 | Slagle | 417/395 |
| 3,753,629 | 8/1973 | Jackson | 417/388 |
| 3,782,863 | 1/1974 | Rupp | 417/393 |
| 3,787,829 | 1/1974 | Schneier | 340/244 A |
| 3,790,030 | 2/1974 | Ives | 222/135 |
| 3,808,814 | 5/1974 | Macy, II | 60/487 |
| 3,813,191 | 5/1974 | Foster | 416/406 |
| 3,830,405 | 8/1974 | Jaeger | 222/129.3 |
| 3,981,414 | 9/1976 | Gust et al. | 222/38 |
| 4,008,984 | 2/1977 | Scholle | 414/393 |
| 4,111,613 | 9/1978 | Martin et al. | 417/420 |
| 4,124,147 | 11/1978 | Priese et al. | 222/135 |
| 4,127,365 | 11/1978 | Martin et al. | 417/420 |
| 4,163,164 | 7/1979 | Pieters | 310/103 |
| 4,165,206 | 8/1979 | Martin et al. | 417/310 |
| 4,172,698 | 10/1979 | Hiaz et al. | 417/393 |
| 4,247,018 | 1/1981 | Credle | 222/1 |
| 4,283,645 | 8/1981 | Hoffman | 310/87 |
| 4,313,714 | 2/1982 | Kubeczka | 417/273 |
| 4,349,130 | 9/1982 | Bair | 222/129.2 |
| 4,398,577 | 8/1983 | Sauer | 141/135 |
| 4,406,382 | 9/1983 | Roth | 222/64 |
| 4,436,493 | 3/1984 | Credle, Jr. | 417/393 |
| 4,540,349 | 9/1985 | Du | 417/393 |
| 4,551,076 | 11/1985 | DuBois | 417/395 |
| 4,619,378 | 10/1986 | de Man | 222/144.5 |
| 4,645,095 | 2/1987 | Coppola | 222/64 |
| 4,681,518 | 7/1987 | Credle, Jr. | 417/395 |
| 4,690,310 | 9/1987 | Rasmussen | 222/309 |
| 4,736,873 | 4/1988 | Patriquin | 222/249 |
| 4,753,370 | 6/1988 | Rudick | 222/105 |
| 4,790,458 | 12/1988 | Moore | 222/386 |
| 4,793,524 | 12/1988 | Starr | 222/309 |
| 4,815,634 | 3/1989 | Nowicki | 222/133 |
| 4,828,465 | 5/1989 | Credle, Jr. | 417/395 |
| 4,898,518 | 2/1990 | Hubbard et al. | 416/360 |
| 4,923,168 | 5/1990 | Murata et al. | 251/75 |
| 4,930,555 | 6/1990 | Rudick | 141/98 |
| 4,957,220 | 9/1990 | Du | 222/66 |
| 4,967,936 | 11/1990 | Bingler | 222/129.2 |
| 5,002,469 | 3/1991 | Murata et al. | 417/403 |
| 5,056,686 | 10/1991 | Jarrett | 222/129.2 |
| 5,083,906 | 1/1992 | Du | 417/395 |
| 5,158,210 | 10/1992 | Du | 222/134 |
| 5,170,912 | 12/1992 | Du | 222/129.2 |
| 5,188,255 | 2/1993 | Du | 222/1 |
| 5,230,443 | 7/1993 | Du | 222/123 |
| 5,350,083 | 9/1994 | Du | 222/134 |
| 5,361,943 | 11/1994 | Du | 222/134 |
| 5,435,466 | 7/1995 | Du | 222/108 |
| 5,470,209 | 11/1995 | Hartley et al. | 417/401 |
| 5,615,802 | 4/1997 | Horino et al. | 222/66 |
| 5,909,825 | 6/1999 | Lydford | 222/67 |

BEER KEG AND PRE-MIXED BEVERAGE TANK CHANGE-OVER DEVICE

FIELD OF THE INVENTION

The present invention relates generally to beverage dispensers, and more particularly to a fluid dispenser change-over device which includes a piston arrangement linked to a slide valve for selectively dispensing a fluid, such as a beverage, from multiple fluid sources.

BACKGROUND OF THE INVENTION

As is well known, a variety of beverages, such as beer and pre-mixed beverages (e.g. sodas), are dispensed from kegs, tanks, canisters and other portable storage reservoirs/ sources. The motive force for delivering a particular beverage is typically effectuated by a pressurized source of carbon dioxide gas which is supplied to the interior of the storage reservoir/source. For example, a beer keg containing pressurized beer may be accessed via a beer tap which is connected to a dispenser. When the beer keg runs dry, the operator must remove the beer tap from the now empty beer keg and attach it to any alternate one. This change-over process is time consuming. In addition, when the beer keg begins to run low, the concentration of foam to liquid which is delivered to the beer tap tends to increase. Serving a beverage, such as beer, with a relatively high proportion of foam content is usually unacceptable. As such, in addition to changing over to another beer keg, the operator must take time to purge the beer tap and dispenser of the high foam content beer before being able to continue serving beer.

It is desirable to reduce the amount of time required to change-over to an alternative beverage source and being able to continue dispensing the beverage. This is especially the case where the dispensed beverages are in high demand. For example, the demand for dispensed beverages is particularly great during an intermission at a sporting event.

Various prior art change-over devices have been developed for reducing the amount of time required to switch over to an alternate beverage source. Such a change-over device may be configured to connected with at least two beverage sources. A dispenser is also connected to the change-over device. The change-over device is adapted to sense that a particular source has run dry and then switches to another source. These prior art change-over devices, however, are typically complex and may include a variety of electronic sensors and actuators. Such complexity often impacts the manufacturing and maintenance costs, reliability and ease of use associated with the devices. In addition, not all such prior art device are capable of sensing when the beverage has an unacceptably high foam content. Those devices that are capable of such sensing are typically complex and suffer from the additional manufacturing and maintenance cost, reliability and ease of use problems.

It is therefore evident that there exists a need in the art for a beverage change-over device which is relatively simple in construction and use.

SUMMARY OF THE INVENTION

In accordance with the present invention, there is provided a self-actuating fluid dispenser change-over device for selectively dispensing a fluid from multiple fluid sources. The change-over device is provided with a housing having first and second cylinders. The change-over device is further provided with first and second pistons which are interconnected and movable between open and closed positions within respective ones of the first and second cylinders. The change-over device is further provided with a slide valve which is movable between first and second positions for alternately dispensing fluid from a respective one of the first and second cylinders. The change over device is further provided with a linkage which connects the pistons to the slide valve for moving the slide valve in response to movement of the pistons. The linkage has a biasing spring for urging the slide valve between a respective one of the first and second positions. The change-over device is configured such that when first piston is in the open position, the second piston is in the closed position and when the second piston is in the open, position the first piston is in the closed position. The pistons move in response to a fluidic pressure differential between the first and second cylinders which is sufficiently large so as to cause flexure of the biasing spring thereby facilitating movement of the slide valve between the first and second positions.

Preferably, the first and second cylinders each respectively have inlet and outlet ports for respectively receiving and discharging fluid therethrough. In practice, the first and second cylinders are each connected to first and second fluid sources via their respective inlet ports. It is contemplated that the fluid sources introduce fluid at given delivery pressure. Typically, a carbon-dioxide source is used provide the required delivery pressure. The pressurized fluids are introduced into the first and second cylinders, thereby pressurizing the cylinders and imparting force against the first and second pistons, respectively.

As mentioned above, the slide valve operates between first and second positions. The pistons move in response to a fluidic pressure differential between the first and second cylinders, thereby facilitating movement of the slide valve between the first and second positions. With the slide valve in the first position, for example, the pressurized fluid introduced into the first cylinder is allowed to flow out of the first cylinder via the outlet port and through the slide valve. Thus, with the slide valve in the first position, a fluid path is created from the first fluid source through the slide valve for dispensing such fluid.

It is contemplated that the first fluid source may eventually run dry or at least a low flow situation. In such an event, the change-over device of the present invention is adapted to switch to an alternate fluid source (e.g., the exemplar second fluid source). As the amount of fluid introduced into the first cylinder is decreased from its previous flow, the pressure differential between the first and second cylinders increases. The interconnected first and second pistons are responsive to a sufficiently large pressure differential in comparison to the spring force of biasing spring. Once the pressure differential effectively overcomes the biasing spring, the pistons move and cause the slide valve to shift into its second position. With the slide valve in the second position, fluid flow through the first cylinder is stopped. Fluid from the second source, however, is allowed to flow into the second cylinder and through the slide valve. In doing so, a successful change-over from the first fluid source to the second fluid source is achieved.

In the preferred embodiment of the present invention, the change-over device is provided with at least one valving member. The valving member is provided with a valve housing having a fluid chamber for receiving a fluid therein. The valving member is further provided with a float which is disposed within the fluid chamber. The valving member is further provided with a lower discharge port which is disposable in fluid communication with the inlet port of a respective one of the first and second cylinders. The lower discharge port is sized and configured to sealably receive the float. The float is configured to seats in the lower discharge port thereby mitigating passage of fluid therethrough upon there being less than a predetermined level of fluid within the fluid chamber.

Thus, the valving member operates as a check valve which closes subsequent to the amount of fluid within the fluid chamber being less than the predetermined level. Such level is adjusted by altering the buoyancy of the float. As such, where a fluid source tends to have a high foam to liquid ratio as it begins to run dry, the fluid chamber/float configuration effectively acts as a trap to break the flow path from the fluid source before high foam content fluid is passed through into a respective one of the first and second cylinders.

In addition, the valve housing is further provided with an upper venting port for venting fluid from the fluid chamber. In an alternate venting configuration, the valve housing has an aperture and the valve housing having an axially movable shaft portion which is sized and configured to slidably engage the aperture therein. The shaft portion has a shaft tip which is sized and configured to engage the float for unseating the float when the float is seated in the lower discharge port thereby facilitating passage of fluid therethrough. The valve housing has a lower venting port for venting fluid from the fluid chamber and the shaft portion has extended and retracted positions. The shaft portion intersects the lower venting port and is sized and configured to mitigate passage of fluid through the lower venting port while in the extended position and to facilitate the passage of fluid through the lower venting port while in the retracted position.

Preferably, the change-over device is provided with flexible diaphragms for respectively providing seals between the first and second pistons and the first and second cylinders. The change-over device may be provided with a shaft which extends between and interconnects the first and second pistons. The first member mechanically couples the slide valve and the second member mechanically couples the shaft such that movement of the shaft effect movement of the slide valve.

In addition, the linkage may be provided with a first member and a second member. The biasing spring is preferably a compression spring and is interposed between the first and second members so as to urge the first and second members away from one another upon compression of the biasing spring. The linkage is further provided with a yoke within which the first member, the second member and the biasing spring are disposed such that the yoke moves the first member, the second member and the biasing spring so as to effect movement of the slide valve between the first and second positions thereof.

In an alternate embodiment of the present invention, there is provided a self-actuating fluid dispenser change-over device for selectively dispensing a fluid from multiple fluid sources. The change-over device has a housing having first and second cylinder halves. The change-over device further has a piston having a central bore therethrough and is movable between first and second positions within the cylinder halves. A conduit member which is movable between first and second positions for alternately dispensing fluid from a respective one of the first and second cylinder halves is further provided. The conduit member has an inner passage for dispensing fluid therethrough from the first cylinder half and an outer surface. The outer surface is sized and configured to slidably engage the central bore of the piston for dispensing fluid thereover from the second cylinder half. The change-over device is further provided with a biasing spring connecting the piston to the conduit member for urging the conduit member between a respective one of the first and second positions in response to movement of the piston. When the conduit member is in the first position, the piston is in the first position and fluid is dispensable from the first cylinder half. When the conduit member is in the second position, the piston is in the second position and fluid is dispensable from the second cylinder half. The piston moves in response to a fluidic pressure differential between the first and second cylinder halves which is sufficiently large so as to cause flexure of the biasing spring thereby facilitating movement of the conduit member between the first and second positions.

The conduit member is preferably provided with a first end disposed within the second cylinder half and in fluid communication therewith. Additionally, a seal portion is disposed about the outer surface of the conduit member adjacent the first end thereof. The second cylinder half has a dispensing port for discharging fluid therethrough and the seal portion being sized and configured to engage the dispensing port such that when the conduit member is in the first position the dispensing port is in fluid communication with the first cylinder half via the inner passage. The seal portion is further sized and configured to engage the dispensing port such that when the conduit member is in the second position the dispensing port is in fluid communication with the second cylinder half.

A lever for manually actuating the piston is preferably provided. The lever is in mechanical communication with the piston and is sized and configured to rotate in response to movement of the piston. In this respect, the piston has a first geared portion and the lever has a second geared portion sized and configured to engage the first geared portion of the piston.

As such, based on the foregoing, the present invention mitigates the inefficiencies and limitations associated with prior art fluid dispenser change-over devices. Advantageously, the change-over device of the present invention does not rely upon any electronic sensor to detect that a particular fluid supply source has run dry or has begun to foam.

Significantly, the change-over device of the present invention operates in response to a fluidic pressure differential between the first and second cylinders. This arrangement is relatively simple in construction and operation. In addition, the biasing spring ensures that the slide valve will not enter into a stall position (i.e., half way between the first and second positions) thereby facilitating that a single fluid path will be available from either the first or second fluid sources. This biasing spring arrangement is likewise relatively simple in construction and operation.

In addition, the change-over device of the present invention is particular suited to avoiding dispensing fluids having a high foam content. This is especially facilitated by the valving member. As mentioned above, the valving member operates as a check valve which closes subsequent to the amount of fluid within the fluid chamber being less than the predetermined level. The predetermined level is adjusted by altering the buoyancy of the float. High foam content fluid introduced into the fluid chamber of the valving member effectively breaks the flow path from the fluid source before high foam content fluid is passed through into a respective one of the first and second cylinders. Subsequent to such breaking of the flow path through the particular cylinder results in a change-over to the other fluid source. Importantly, because of the nature of the valving member, high foam content fluids are not introduced into the cylinders. As a result, after successfully changing-over to an alternate fluid source, there is no need to purge the system of undesirable high foam content liquid. Thus, in addition to automatically changing over to another fluid source, the change-over device of the present invention saves the operator from having to take time to purge the system of high foam content fluid.

Accordingly, the present invention represents a significant advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENTS

Figure 1:
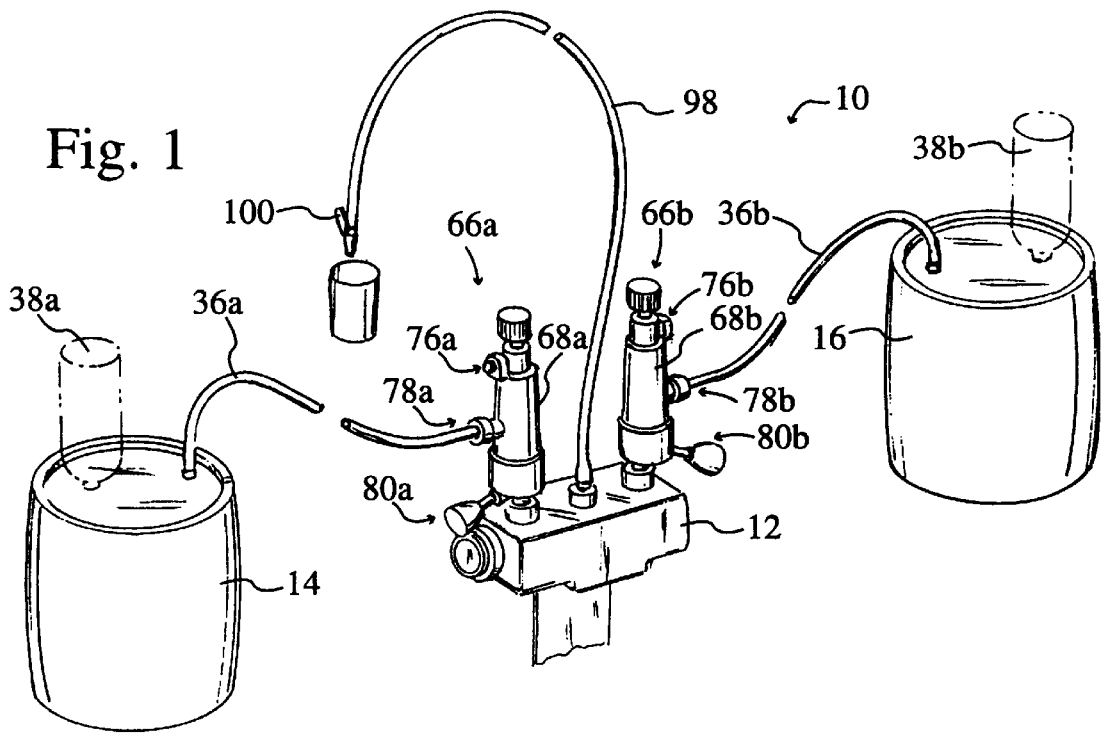
FIG. 1 is a perspective view of the change-over device of the present invention showing in two fluid sources.

Referring now to the drawings wherein the showings are for purposes of illustrating a preferred embodiment of the present invention only, and not for purposes of limiting the same, FIGS. 1–10 illustrate a fluid dispenser change-over device which is constructed in accordance with the present invention.

Figure 2:
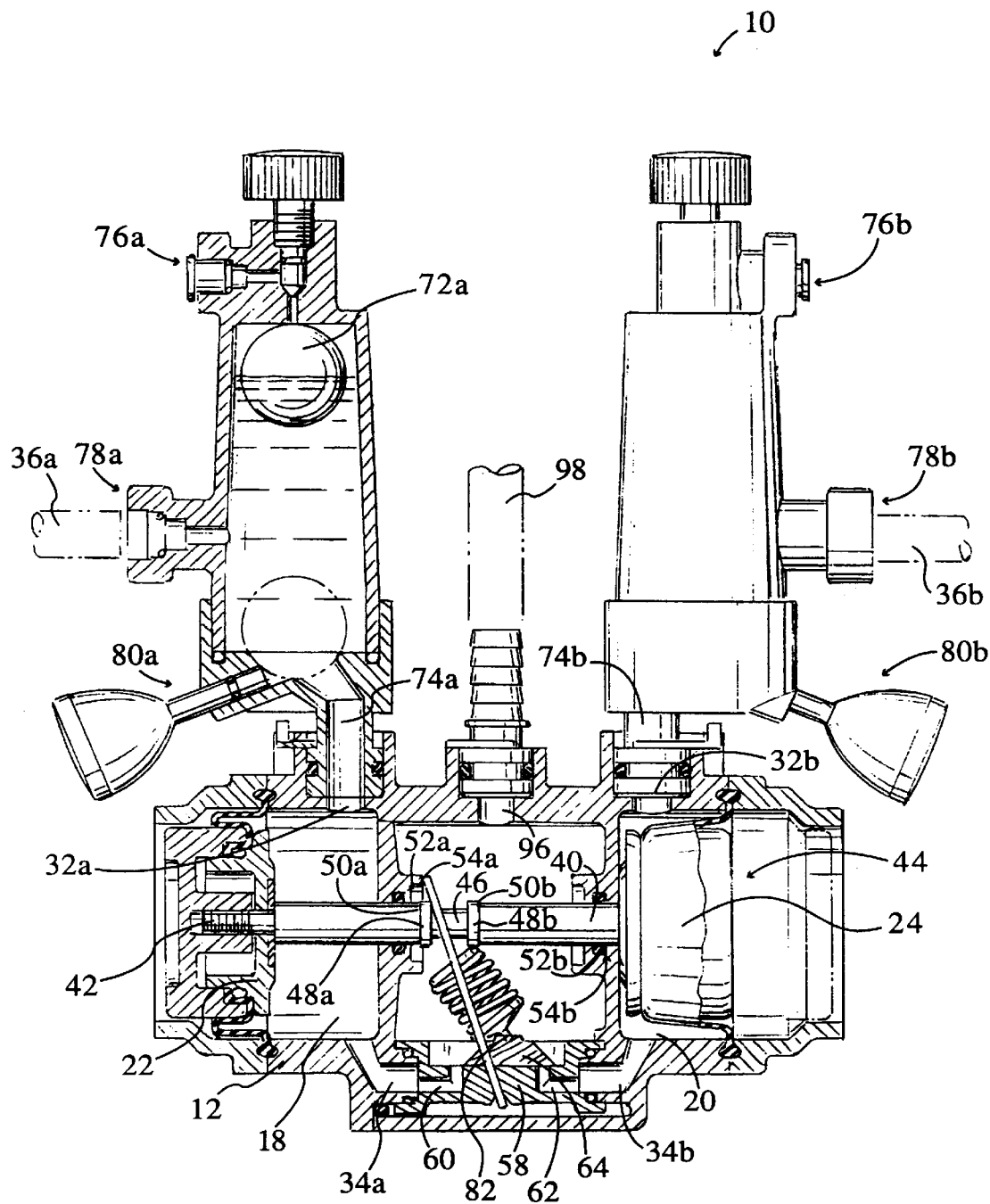
FIG. 2 is a partial cross-sectional view of the change-over device of the present invention.
Figures 3, 4:
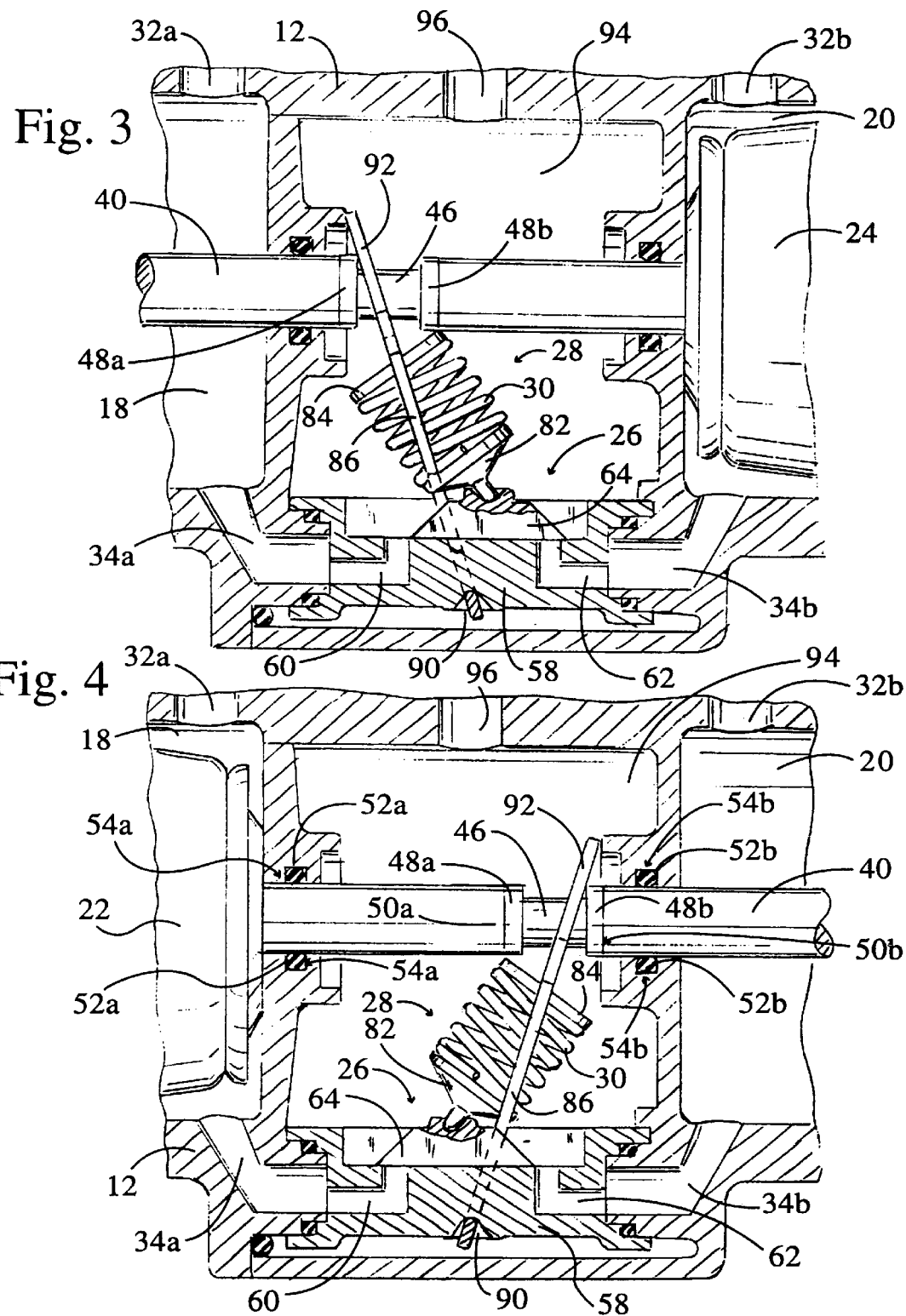
FIG. 3 is a partial cross-sectional view of the change-over device of the present invention with the slide valve in its first position.
FIG. 4 is the partial cross-sectional view of the change-over device of the present invention as show in FIG. 3 except with the slide valve in its second position.

In accordance with the present invention, there is provided a self-actuating fluid dispenser change-over device 10 for selectively dispensing a fluid from multiple fluid sources, such as first and second fluid sources 14, 16. The change-over device 10 is provided with a housing 12 having first and second cylinders 18, 20. The change-over device 10 is further provided with first and second pistons 22, 24 which are interconnected and movable between open and closed positions within respective ones of the first and second cylinders 18, 20. The change-over device 10 is further provided with a slide valve 26 which is movable between first and second positions for alternately dispensing fluid from a respective one of the first and second cylinders 18, 20. The change over device 10 is further provided with a linkage 28 which connects the pistons 22, 24 to the slide valve 26 for moving the slide valve 26 in response to movement of the pistons 22, 24. The linkage 28 has a biasing spring 30 for urging the slide valve 26 between a respective one of the first and second positions. The change-over device 10 is configured such that when first piston 22 is in the open position, the second piston 24 is in the closed position, as shown in FIGS. 2 and 3. The change-over device 10 is further configured such that when the second piston 24 is in the open position, the first piston 22 is in the closed position, as shown in FIG. 4. The pistons 22, 24 move in response to a fluidic pressure differential between the first and second cylinders 18, 20 which is sufficiently large so as to cause flexure of the biasing spring 30 thereby facilitating movement of the slide valve 26 between the first and second positions.

Preferably, the first and second cylinders 18, 20 each respectively have inlet ports 32a, 32b and outlet ports 34a, 34b for respectively receiving and discharging fluid therethrough. In practice, the first and second cylinders 18, 20 are each connectable to the first and second fluid sources 14, 16 via their respective inlet ports 32a, 32b. Fluid conduits 36a, 36b may be provided to connect the first and second cylinders 18, 20 to the inlet ports 32a, 32b. It is contemplated that the fluid sources 14, 16 introduce fluid at given delivery pressure. The fluid sources 14, 16 may be charged with pressure via carbon dioxide tanks 38a, 38b. The pressurized fluids are introduced into the first and second cylinders 18, 20, thereby pressurizing the cylinders 18, 20 and imparting force against the first and second pistons 22, 24, respectively.

The change-over device 10 may be provided with a shaft 40 which extends between and interconnects the first and second pistons 22, 24. The shaft 40 interconnects the first and second pistons 22, 24 such that they move together along a common axis within their first and second cylinders 18, 20, respectively. The shaft 40 has a first threaded end 42 attached it to the first piston 18 and a second threaded end 44 attaching it to the second piston 24. A reduced diameter section 46 is formed at approximately the mid point of the shaft 40. Resilient washers 48a, 48b are formed at shoulders 50a, 50b of the reduced diameter section 46 upon the shaft 40. O-rings 52a, 52b held within grooves 54a, 54b formed in the housing 12 facilitate translation or sliding movement of the shaft 40 within each of the first and second cylinders 18, 20.

Preferably, the change-over device 10 is provided with flexible diaphragms 56a, 56b for respectively providing seals between the first and second pistons 22, 24 and the first and second cylinders 18, 20. The diaphragms 56a, 56b are formed so as to provide a continuous covering over the first and second pistons 22, 24, respectively.

The slide valve 26 is provided with a slide valve body 58 having first and second passages 60, 62. The first passage 60 in disposed in fluid communication with the first cylinder 18 and the second passage 62 is disposed in fluid communication with the second cylinder 20. The slide valve 26 is further provided with a slide 64 which is slidably received by the slide valve body 58. As mentioned above, the slide valve 26 operates between first and second positions. When the slide valve 26 is in its first position, the slide 64 is configured to allow fluid to flow from the first cylinder 18 through the first passage 60 while blocking fluid from flowing through the second passage 62. Similarly, when the slide valve 26 is in its second position, the slide 64 is configured to allow fluid to flow from the second cylinder 20 through the second passage 62 while blocking fluid from flowing through the first passage 60. The pistons 22, 24 move in response to a fluidic pressure differential between the first and second cylinders 18, 24, thereby facilitating movement of the slide valve 26 between the first and second positions. With the slide valve 26 in the first position, for example, the pressurized fluid introduced into the first cylinder 18 is allowed to flow out of the first cylinder 18 via the outlet port 34a and through the first passage 60 of the slide valve 26. Thus, with the slide valve 26 in the first position, a fluid path is created from the first fluid source 14 through the slide valve 26 for dispensing such fluid.

It is contemplated that the first fluid source 14 may eventually run dry or at least a low flow situation. In such an event, the change-over device 10 of the present invention is particularly adapted to switch to an alternate fluid source (e.g., the exemplar second fluid source 16). As the amount of fluid introduced into the first cylinder 18 is decreased from its previous flow, the pressure differential between the first and second cylinders 18, 20 increases. The interconnected first and second pistons 22, 24 are responsive to a sufficiently large pressure differential in comparison to the spring force of biasing spring 30. Once the pressure differential effectively overcomes the biasing spring 30, the pistons 22, 24 move and cause the slide valve 26 to shift into its second position. With the slide valve 26 in the second position, fluid flow through the first cylinder 18 is stopped. Fluid from the second fluid source 16, however, is allowed to flow into the second cylinder 20 and through the slide valve 26. In doing so, a successful change-over from the first fluid source 14 to the second fluid source 16 is achieved.

In the preferred embodiment of the present invention, the change-over device 10 is provided with valving members 66a, 66b. The valving members 66a, 66b are each provided with a valve housing 68a, 68b each defining a fluid chamber 70a, 70b for receiving a fluid therein. The valve housings 68a, 68b are each provided with a respective inlet port 78a, 78b. The valving members 66a, 66b are further each provided with a respective float 72a, 72b which are disposed within the respective fluid chambers 70a, 70b. The valving members 66a, 66b are each further provided with a lower discharge port 74a, 74b. The lower discharge ports 74a, 74b are disposed in fluid communication with the inlet port 32a, 32b of a respective one of the first and second cylinders 18, 20. The lower discharge ports 74a, 74b are sized and configured to sealably receive their associated floats 72a, 72b. The floats 72a, 72b are configured to seat in the respective lower discharge ports 74a, 74b thereby mitigating passage of fluid therethrough upon there being less than a predetermined level of fluid within a respective fluid chamber 70a, 70b.

Thus, the valving members 66a, 66b operate as check valves which close subsequent to the amount of fluid within the respective fluid chambers 70a, 70b being less than the predetermined level. Such level is adjusted by altering the buoyancy of the floats 72a, 72b. As such, where a fluid source tends to have a high foam to liquid ratio as it begins to run dry, the fluid chamber/float configuration effectively acts as a trap to break the flow path from the fluid source before high foam content fluid is passed through into a respective one of the first and second cylinders 18, 20.

The valving members 66a, 66b may be further provided with valve opening devices 80a, 80b which are formed to unseat a respective float 72a, 72b engaged with the lower discharge ports 74a, 74b. Thus, the valve opening devices 80a, 80b operate to open or otherwise facilitate fluid flow through the lower discharge ports 74a, 74b.

In addition, the valve housings 68a, 68b are each further provided with upper venting ports 76a, 76b for venting fluid from its associated fluid chamber 70a, 70b. The upper venting ports 76a, 76b are particularly useful to purge the fluid chambers 70a, 70b of any undesirable fluids, such as high foam content fluids.

Figure 5:
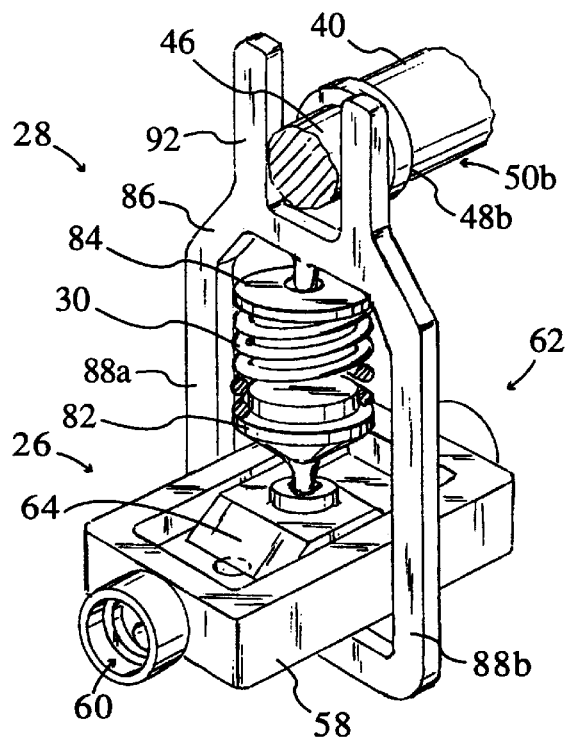
FIG. 5 is an enlarged perspective view of the slide valve, biasing spring and yoke in their respective operable relationships.

With particular attention to FIGS. 3–5, the linkage 28 may be provided with a first member 82 and a second member 84. The first member 82 mechanically couples the slide valve 26 and the second member 84 mechanically couples the shaft 40 such that movement of the shaft 40 effect movement of the slide valve 26. The biasing spring 30 is preferably a compression spring and is interposed between the first and second members 82, 84 so as to urge the first and second members 82, 84 away from one another upon compression of the biasing spring 30.

The linkage 28 is further provided with a yoke 86 within which the first member 82, the second member 84 and the biasing spring 30 are disposed such that the yoke 86 moves the first member 82, the second member 84 and the biasing spring 30 so as to effect movement of the slide valve 26 between the first and second positions thereof. The yoke 86 is formed in a frame like configuration and pivoting about lower ends 88a, 88b thereof disposed within a V-groove 90 formed in the slide valve body 58. The upper end 92 of the yoke is configured as a U-member which receives the reduced diameter section 46 of the shaft 40 such that the yoke 86 pivots about the V-groove 90 of the slide valve body 58 in response to movement of the slide valve 26. Thus, as the slide 64 of the slide valve 26 moves back and forth laterally, each of the resilient washers 48a, 48b of the shaft 40 alternately abut the yoke 86 and urge it back and forth in a pivoting motion about the V-groove 90.

A stalling of the slide valve 26 describes an event where the slide valve 26 is in neither one of its first or second positions. The nature of the linkage 28, however, prevents stalling of the slide valve 26 by assuring positive activation of the slide valve 26. As the shaft 40 travels from one position, to the another position thereof, the biasing spring 30 is compressed as the yoke 86 urges the second member 84 towards the first member 82. Movement of the slide valve 26 occurs as the yoke 86 passes over its center or vertical position, as shown in FIG. 5, thereby substantially changing the angle-of-attack of the biasing spring 30 which is thus placed in an orientation having sufficient leverage to quickly and forcible move the slide valve 26 to either one of its first or second positions. The angle-of-attack of the biasing spring 30 is rapidly changed from one wherein the biasing spring 30 compresses and does not exert a force tending to move the slide valve 26 to a position wherein the biasing spring 30 is free to expand and capable of moving the slide valve 26 while exerting favorable leverage thereupon. As those skilled in the art will appreciate, the force applied by the biasing spring 30 to the slide valve 26 is dependent upon the angle-of-attack. The more closely to parallel to the desired direction of movement that the force is applied, the greater the amount of the force applied that is actually utilized to effect such movement. Thus, stalling of the slide valve 26 is inhibited because when the yoke 86 is at its center position the biasing spring 30 is compressed and requires very little further movement of the yoke 86 to facilitate forceful expansion thereof, thereby moving the slide valve 26 into one of either of its first or second positions.

Preferably, the change-over device 10 of the present invention is provided with an outlet manifold 94 which is formed in the housing 12. The outlet manifold 94 is disposed in fluid communication with the slide valve 26. With the slide valve 26 in its first position, the first passage 60 of the slide valve 26 is in fluid communication with the outlet manifold 94. With the slide valve 26 in its second position, the second passage 62 of the slide valve 26 is in fluid communication with the outlet manifold 94. Thus, the slide valve 26 facilitate fluid from flowing into the outlet manifold 94 selectively from a respective one of the first and second cylinders 18, 20. The outlet manifold 94 is provided with an dispenser port 96 which is connectable to a dispensing conduit 98. The dispensing conduit may be connected to a dispenser, such as the nozzle 100 shown in FIG. 1.

Figures 6, 7:
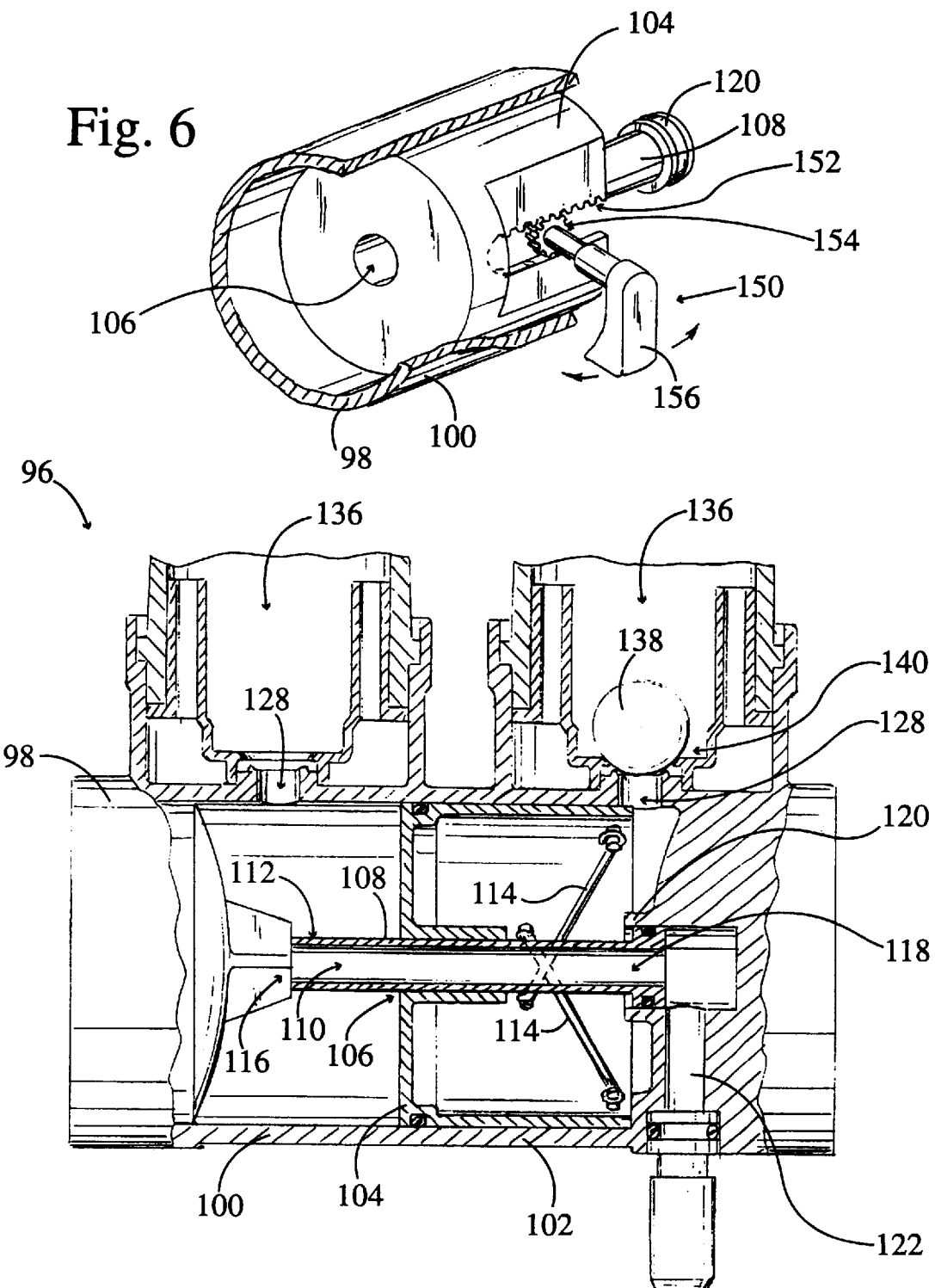
FIG. 6 is a partial perspective view of an alternate embodiment of the present change-over device and depicts a piston engaged with a manual actuation lever.
FIG. 7 is a cross sectional view of the alternate embodiment the present invention with the piston in its operable position for dispensing fluid from the leftmost fluid source.
Figure 8:
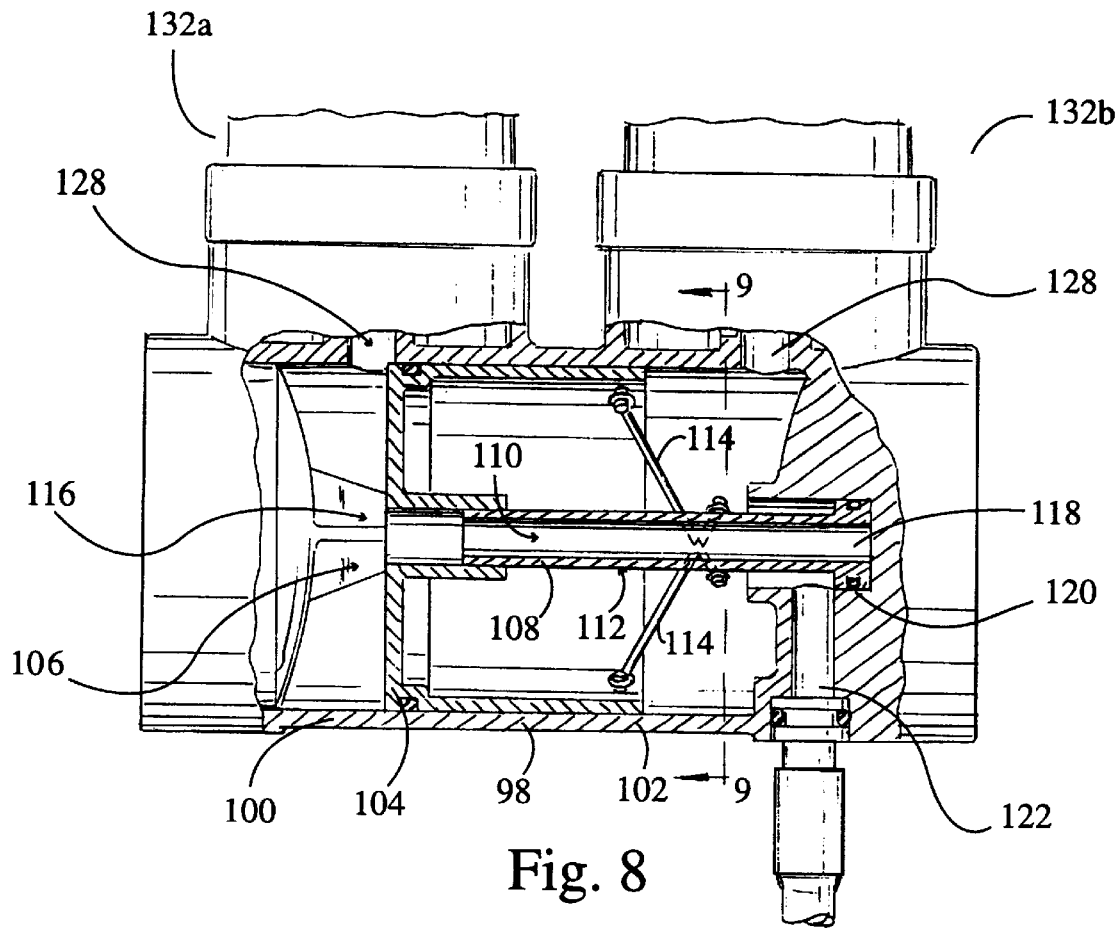
FIG. 8 depicts a similar cross sectional view as that of FIG. 7 with the piston in its operable position for dispensing fluid from the rightmost fluid source.
Figure 9:
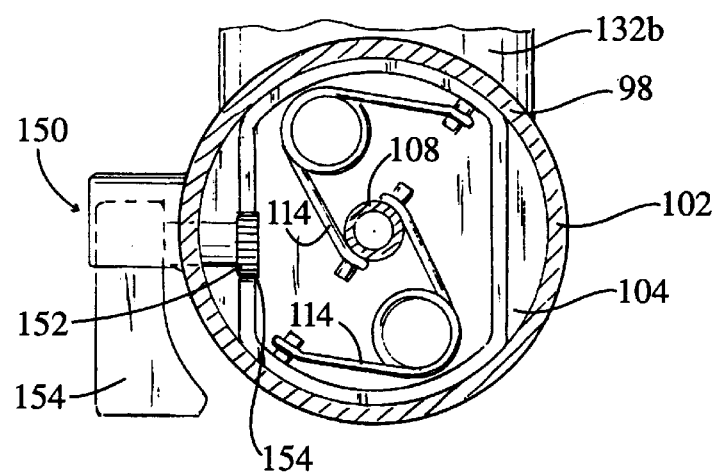
FIG. 9 depicts a cross sectional end view of the piston of FIG. 8.

Referring now to FIGS. 6–10, there is depicted an alternate embodiment of the present invention. In particular, there is provided a self-actuating fluid dispenser change-over device 96 for selectively dispensing a fluid from multiple fluid sources. The change-over device 96 has a housing 98 having first and second cylinder halves 100, 102. The change-over device 96 further has a piston 104 which has a central bore 106 therethrough. The piston 104 is movable between first and second positions within the cylinder halves 100, 102, as respectively depicted in FIGS. 7 and 8. A conduit member 108 is provided which is moves between first and second positions for alternately dispensing fluid from a respective one of the first and second cylinder halves 100, 102. The conduit member 108 has an inner passage 110 for dispensing fluid therethrough from the first cylinder half 100, as shown in FIG. 7. The conduit member 108 is additionally provided with an outer surface 112. The outer surface 112 is sized and configured to slidably engage the central bore 106 of the piston 104 for dispensing fluid thereover from the second cylinder half 102, as shown in FIG. 8.

The alternate embodiment change-over device 96 is further provided with a biasing spring 114 which connects the piston 104 to the conduit member 108 for urging the conduit member 108 between a respective one of the first and second positions in response to movement of the piston 104. The conduit member is configured such that when the conduit member 108 is in the first position, the piston 104 is in the first position and fluid is dispensable from the first cylinder half 100. The conduit member 108 is further configured such that when the conduit member 108 is in the second position, the piston 104 is in the second position and fluid is dispensable from the second cylinder half 102. The piston 104 moves in response to a fluidic pressure differential between the first and second cylinder halves 100, 102 which is sufficiently large so as to cause flexure of the biasing spring 114 thereby facilitating movement of the conduit member 108 between the first and second positions.

The conduit member 108 is provided with first and second ends 116, 118 thereof. The first end 116 is disposed within the second cylinder half 102 and in fluid communication therewith. A seal portion 120 is disposed about the outer surface 112 of the conduit member 108 adjacent the first end 116 thereof. Although the seal portion 120 is depicted as an O-ring, other configurations may be chosen from those well known to one of ordinary skill in the art. The second cylinder half 102 has a dispensing port 122 for discharging fluid therethrough and the seal portion 120 is sized and configured to engage the dispensing port 122. The seal portion 120 is engaged such that when the conduit member 108 is in the first position, the dispensing port 122 is in fluid communication with the first cylinder half 100 via the inner passage 110. The seal portion 120 is further sized and configured to engage the dispensing port 122 such that when the conduit member 108 is in the second position the dispensing port 122 is in fluid communication with the second cylinder half 102.

A stalling of the piston 104 and conduit member 108 describes an event where both components are in neither one of their respective first or second positions. The nature of the biasing spring 114, however, prevents stalling of the piston 104 and conduit member 108 by assuring positive activation of both components. As the piston 104 travels from one position, to the another position thereof, the biasing spring 114 is compressed. The biasing spring 114 is configured such the it is flexed to its maximum deflection when the piston 104 is approximately half way between its first and second positions. Movement of the conduit member 108 occurs as the piston 104 passes over its halfway mark between the first and second positions, thereby causing the biasing spring 114 to compress and to subsequently quickly and forcible expand to move the piston 104 and conduit member 108 in opposing directions. Thus, stalling of the slide valve 26 is inhibited because when the piston 104 is at its center position the biasing spring 114 is compressed and requires very little further movement to facilitate forceful expansion thereof, thereby moving the conduit member 108 into one of either of its first or second positions.

In addition, the piston 104 may be provided with a manual actuation device which takes the form of a lever 150, as best depicted in FIG. 6. The lever 150 is disposed in mechanical communication with the piston 104. In this respect, the piston 104 has a first geared portion 152 and the lever 150 has a second geared portion 154 sized and configured to engage the first geared portion 152 of the piston 104. As such, the lever 150 is sized and configured to rotate in response to movement of the piston 104. The lever 150 is provided with a handle 156 which is configured to be generally pointing in the direction of the first cylinder half 100 while fluid is dischargeable therefrom. Further, the handle is configured to be generally pointing in the direction of the second cylinder half 102 while fluid is dischargeable therefrom. In this respect, it is contemplated that the lever 150, not only functions to manually actuate the piston 104, but also functions to provide a visual indicator as to the fluid source from which fluid is dispensing therefrom.

The dispensing port 122 has first and second annular surfaces 124, 126 therein. The first and second annular surfaces 124, 126 are sized and configured to axially receive the second end 118 of the conduit member 108 therein. The first annular surface 124 is sized and configured to sealably engage the seal portion 120 of the conduit member 108, when the conduit member 108 is in the first position, as shown in FIG. 7. Thus, with the conduit member 108 in its first position, fluid is dischargable through the inner passage 110 thereof. The second annular surface 126 is sized and configured to sealably engage the seal portion 120 of the conduit member 108 when the conduit member 108 is in the second position, as shown in FIG. 8. With the conduit member 108 is the second position, fluid flow over the outer surface 112 of the conduit member 108 and through the dispensing port 122 and flow it prevented from flowing through the inner passage 110 of the conduit member 108.

The first and second cylinder halves 100, 102 are further provided with respective inlet ports 128, 130 for receiving fluid therethrough. Preferably attached to the inlet ports 128, 130 are valving members 132a, 132b. Each valving member 132 is provided with a valve housing 134 having a fluid chamber 136 for receiving a fluid therein. A float 138 is disposed within the fluid chamber 136. The valving member 132 is further provided with a lower discharge port 140 which is disposed in fluid communication with the inlet port 128 of a respective one of the first and second cylinder halves 100, 102. The lower discharge port 140 is sized and configured to sealably receive the float 138. In this respect, the float 138 is formed to seat in the lower discharge port 140 thereby mitigating passage of fluid therethrough upon there being less than a predetermined level of fluid within the fluid chamber 136.

Figure 10:
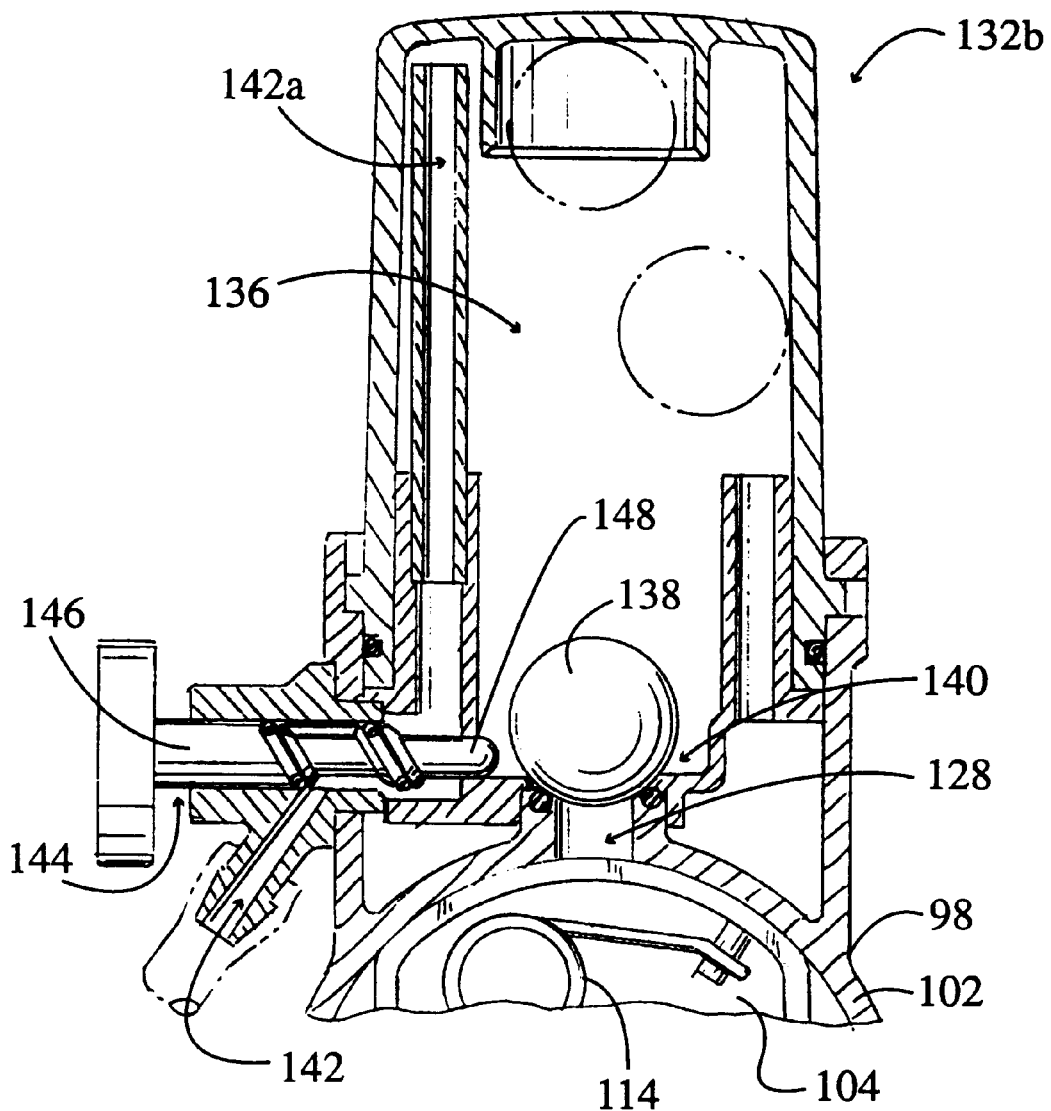
FIG. 10 depicts an alternate embodiment of the valving member.

The valve housing 134 is preferably provided with a lower venting port 142 for venting fluid from the fluid chamber 136, as shown in FIG. 10. The lowered venting port 142 is provided with a substantially vertical upper passage 142*a* which extends within the fluid chamber 136. In operation, it is contemplated that the fluid chamber 136 may become partially filled with undesirable high foam content fluid. Such high content fluid is contemplated is rise within the fluid chamber 136. Upon opening of the venting port 142, any high foam content fluid will flow into the upper passage 142*a* and subsequently downward through the venting port 142. Additionally, the valve housing 134 has an aperture 144 and an axially movable shaft portion 146 which is sized and configured to slidably engage the aperture 144 therein. The shaft portion 146 has a shaft tip 148 which is sized and configured to engage the float 138 for unseating the float 138 when the float 148 is seated in the lower discharge port 140, thereby facilitating passage of fluid therethrough. The shaft portion 146 has an extended and retracted positions. The shaft portion 146 intersects the lower venting port 142 and is sized and configured to mitigate passage of fluid through the lower venting port 142 while in the extended position and to facilitate the passage of fluid through the lower venting port 142 while in the retracted position. Thus, the it is contemplated that the shaft portion 146 serves the dual function of both venting the fluid chamber 136 and unseating the float 138.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A self-actuating fluid dispenser change-over device for selectively dispensing a fluid from multiple fluid sources, the change-over device comprising:

a housing having first and second cylinders;

first and second pistons, the pistons being interconnected and movable between open and closed positions within respective ones of the first and second cylinders;

a slide valve movable between first and second positions for alternately dispensing fluid from a respective one of the first and second cylinders;

a linkage connecting the pistons to the slide valve for moving the slide valve in response to movement of the pistons, the linkage having a biasing spring for urging the slide valve between a respective one of the first and second positions;

wherein when the first piston is in the open position the second piston is in the closed position, when the second piston is in the open position the first piston is in the closed position; and wherein the pistons move in response to a fluidic pressure differential between the first and second cylinders which is sufficiently large so as to cause flexure of the biasing spring thereby facilitating movement of the slide valve between the first and second positions.

2. The change-over device of claim 1 wherein the first and second cylinders each respectively having an inlet port and an outlet port for respectively receiving and discharging fluid therethrough.

3. The change-over device of claim 2 further comprising at least one valving member comprising:

a valve housing having a fluid chamber for receiving a fluid therein;

a float disposed within the fluid chamber;

a lower discharge port disposable in fluid communication with the inlet port of a respective one of the first and second cylinders, the lower discharge port being sized and configured to sealably receive the float; and wherein the float seats in the lower discharge port thereby mitigating passage of fluid therethrough upon there being less than a predetermined level of fluid within the fluid chamber.

4. The change-over device of claim 3 wherein the valve housing further having an upper venting port for venting fluid from the fluid chamber.

5. The change-over device of claim 1 further comprising flexible diaphragms for respectively providing seals between the first and second pistons and the first and second cylinders.

6. The change-over device of claim 1 further comprising a shaft extending between and interconnecting the first and second pistons.

7. The change-over device of claim 1 wherein the linkage further having a first member and a second member, and the biasing spring being a compression spring and interposed between the first and second members so as to urge the first and second members away from one another upon compression of the biasing spring.

8. The change-over device of claim 7 further comprising a shaft extending between and interconnecting the first and second pistons, and the first member mechanically coupling the slide valve and the second member mechanically coupling the shaft such that movement of the shaft effect movement of the slide valve.

9. The change-over device of claim 7 wherein the linkage further having a yoke within which the first member, the second member and the biasing spring are disposed such that the yoke moves the first member, the second member and the biasing spring so as to effect movement of the slide valve between the first and second positions thereof.

10. The change-over device of claim 1 further comprising an outlet manifold in fluid communication with the slide valve for receiving fluid from a respective one of the first and second cylinders.

11. A self-actuating fluid dispenser change-over device for selectively dispensing a fluid from multiple fluid sources, the change-over device comprising:

a housing having first and second cylinders each respectively having an inlet port and an outlet port for respectively receiving and discharging fluid therethrough;

first and second pistons, the pistons being interconnected and movable between open and closed positions within respective ones of the first and second cylinders;

a slide valve movable between first and second positions for alternately dispensing fluid from a respective one of the first and second cylinders;

at least one valving member comprising a valve housing having a fluid chamber for receiving a fluid therein, a float disposed within the fluid chamber, and a lower discharge port disposable in fluid communication with the inlet port of a respective one of the first and second cylinders, the lower discharge port being sized and configured to sealably receive the float;

wherein when the first piston is in the open position the second piston is in the closed position, when the second piston is in the open position the first piston is in the closed position;

wherein the pistons move in response to a fluidic pressure differential between the first and second cylinders thereby facilitating movement of the slide valve between the first and second positions; and wherein the float seats in the lower discharge port thereby mitigating passage of fluid therethrough upon there being less than a predetermined level of fluid within the fluid chamber.

12. The change-over device of claim 11 wherein the valve housing further having an upper venting port for venting fluid from the fluid chamber.

13. The change-over device of claim 11 wherein the valve housing having an aperture, the valve housing having a axially movable shaft portion sized and configured to slidably engage the aperture therein, the shaft portion having a shaft tip sized and configured to engage the float for unseating the float when the float is seated in the lower discharge port thereby facilitating passage of fluid therethrough.

14. The change-over device of claim 13 wherein the valve housing having a lower venting port for venting fluid from the fluid chamber, the shaft portion having extended and retracted positions, the shaft portion intersecting the lower venting port and sized and configured to mitigate passage of fluid through the lower venting port while in the extended position and to facilitate the passage of fluid through the lower venting port while in the retracted position.

15. The change-over device of claim 11 further comprising flexible diaphragms for respectively providing seals between the first and second pistons and the first and second cylinders.

16. The change-over device of claim 11 further comprising a shaft extending between and interconnecting the first and second pistons.

17. The change-over device of claim 11 further comprising a linkage connecting the pistons to the slide valve for moving the slide valve in response to movement of the pistons, the linkage having a biasing spring for urging the slide valve between a respective one of the first and second positions, the pistons move in response to a fluidic pressure differential between the first and second cylinders which is sufficiently large so as to cause flexure of the biasing spring thereby facilitating movement of the slide valve between the first and second positions.

18. The change-over device of claim 17 wherein the linkage further having an first member and a second member, and the biasing spring being a compression spring and interposed between the first and second members so as to urge the first and second members away from one another upon compression of the biasing spring.

19. The change-over device of claim 18 further comprising a shaft extending between and interconnecting the first and second pistons, and the first member mechanically coupling the slide valve and the second member mechanically coupling the shaft such that movement of the shaft effect movement of the slide valve.

20. The change-over device of claim 18 wherein the linkage further having a yoke within which the first member, the second member and the biasing spring are disposed such that the yoke moves the first member, the second member and the biasing spring so as to effect movement of the slide valve between the first and second positions thereof.

21. The change-over device of claim 11 further comprising an outlet manifold in fluid communication with the slide valve for receiving fluid from a respective one of the first and second cylinders.

22. A self-actuating fluid dispenser change-over device for selectively dispensing a fluid from multiple fluid sources, the change-over device comprising:

a housing having first and second cylinder halves;

a piston having a central bore therethrough and movable between first and second positions within the cylinder halves;

a conduit member movable between first and second positions for alternately dispensing fluid from a respective one of the first and second cylinder halves, the conduit member having an inner passage for dispensing fluid therethrough from the first cylinder half and an outer surface sized and configured to slidably engage the central bore of the piston for dispensing fluid thereover from the second cylinder half; and a biasing spring connecting the piston to the conduit member for urging the conduit member between a respective one of the first and second positions in response to movement of the piston;

wherein when the conduit member is in the first position, the piston is in the first position and fluid is dispensable from the first cylinder half;

wherein when the conduit member is in the second position, the piston is in the second position and fluid is dispensable from the second cylinder half; and wherein the piston moves in response to a fluidic pressure differential between the first and second cylinder halves which is sufficiently large so as to cause flexure of the biasing spring thereby facilitating movement of the conduit member between the first and second positions.

23. The change-over device of claim 22 wherein the conduit member further having a first end disposed within the second cylinder half and in fluid communication therewith and a seal portion disposed about the outer surface of the conduit member adjacent the first end thereof, the second cylinder half having a dispensing port for discharging fluid therethrough, the seal portion being sized and configured to engage the dispensing port such that when the conduit member is in the first position the dispensing port is in fluid communication with the first cylinder half via the inner passage, the seal portion being sized and configured to engage the dispensing port such that when the conduit member is in the second position the discharge port is in fluid communication with the second cylinder half.

24. The change-over device of claim 23 wherein the dispensing port having first and second annular surfaces therein, the first and second annular surfaces being sized and configured to axially receive the second end of the conduit member therein.

25. The change-over device of claim 24 wherein the first annular surface of the dispensing port being sized and configured to sealably engage the seal portion of the conduit member when the conduit member is in the first position, the second annular surface of the dispensing port being sized and configured to sealably engage the seal portion of the conduit member when the conduit member is in the second position.

26. The change-over device of claim 22 wherein the first and second cylinder halves each respectively having an inlet port for receiving fluid therethrough.

27. The change-over device of claim 26 further comprising at least one valving member comprising:
- a valve housing having a fluid chamber for receiving a fluid therein;
- a float disposed within the fluid chamber;
- a lower discharge port disposable in fluid communication with the inlet port of a respective one of the first and second cylinder halves, the lower discharge port being sized and configured to sealably receive the float; and
- wherein the float seats in the lower discharge port thereby mitigating passage of fluid therethrough upon there being less than a predetermined level of fluid within the fluid chamber.

28. The change-over device of claim 27 wherein the valve housing having an aperture and an axially movable shaft portion sized and configured to slidably engage the aperture therein, the shaft portion having a shaft tip sized and configured to engage the float for unseating the float when the float is seated in the lower discharge port thereby facilitating passage of fluid therethrough.

29. The change-over device of claim 28 wherein the valve housing having a lower venting port for venting fluid from the fluid chamber, the shaft portion having an extended and retracted positions, the shaft portion intersecting the lower venting port and sized and configured to mitigate passage of fluid through the lower venting port while in the extended position and to facilitate the passage of fluid through the lower venting port while in the retracted position.

30. The change-over device of claim 22 further comprising a lever for manually actuating the piston, the lever being in mechanical communication with the piston and sized and configured to rotate in response to movement of the piston.

31. The change-over device of claim 30 wherein the piston having a first geared portion and the lever having a second geared portion sized and configured to engage the first geared portion of the piston.

* * * * *